(12) United States Patent
Toulson

(10) Patent No.: US 10,232,398 B2
(45) Date of Patent: Mar. 19, 2019

(54) APPARATUS FOR PROTECTING A SURFACE

(71) Applicant: Clifton Toulson, Michellville, MD (US)

(72) Inventor: Clifton Toulson, Michellville, MD (US)

( * ) Notice: Subject to any disclaimer, the term of this patent is extended or adjusted under 35 U.S.C. 154(b) by 0 days.

(21) Appl. No.: 15/884,348

(22) Filed: Jan. 30, 2018

(65) Prior Publication Data

US 2018/0161798 A1    Jun. 14, 2018

Related U.S. Application Data

(63) Continuation-in-part of application No. 14/644,088, filed on Mar. 10, 2015, now abandoned.

(51) Int. Cl.
| | |
|---|---|
| *B05B 15/58* | (2018.01) |
| *B32B 3/28* | (2006.01) |
| *B32B 3/26* | (2006.01) |
| *B32B 25/08* | (2006.01) |

(52) U.S. Cl.
CPC ............. *B05B 15/58* (2018.02); *B32B 3/26* (2013.01); *B32B 3/266* (2013.01); *B32B 3/28* (2013.01); *B32B 25/08* (2013.01); *B32B 2307/7265* (2013.01); *B32B 2471/04* (2013.01)

(58) Field of Classification Search
CPC . B05B 15/04; B05B 15/0487; B32B 2255/00; B32B 2307/7265; B32B 2571/00; B32B 25/00; B32B 2605/00; B32B 3/04; B32B 3/266; B32B 3/28; B32B 3/30; Y10T 428/1386
See application file for complete search history.

(56) References Cited

U.S. PATENT DOCUMENTS

| | | | | |
|---|---|---|---|---|
| 1,633,951 | A | * | 6/1927 | O'Toole ............. A47G 27/0225 |
| | | | | 4/251.1 |
| 2,465,551 | A | | 3/1949 | Otterness |
| 4,285,075 | A | * | 8/1981 | Nelson ................... A47K 17/00 |
| | | | | 4/251.1 |
| 4,577,713 | A | | 3/1986 | Moon |
| 4,798,754 | A | | 1/1989 | Tomek |
| 5,114,774 | A | * | 5/1992 | Maxim, Jr. ........ A47G 27/0206 |
| | | | | 428/100 |
| 6,062,162 | A | | 5/2000 | Dean |
| 6,120,876 | A | | 9/2000 | Walton |
| 8,315,760 | B2 | | 11/2012 | Costantino |
| 8,515,823 | B2 | | 8/2013 | Cullen |
| 2006/0236487 | A1 | * | 10/2006 | Dean ..................... A47L 23/266 |
| | | | | 15/215 |

* cited by examiner

*Primary Examiner* — Yan Lan

(74) *Attorney, Agent, or Firm* — Relevant IP, LLC

(57) ABSTRACT

Disclosed is an apparatus for protecting a surface including a substrate configured to receive fluid and a layer disposed on the substrate configured to retain or pass fluid thereto and discourage fluid flow therefrom. The substrate has a leading edge with a recess that complements a portion of a tire footprint; defines a semicircle, defines a U-shape; or combinations thereof.

10 Claims, 3 Drawing Sheets

APPARATUS FOR PROTECTING A SURFACE

REFERENCE TO EARLIER APPLICATION

This Application incorporates by reference and, under 35 U.S.C. § 120, claims priority to U.S. Utility patent application Ser. No. 14/644,088 filed on Mar. 10, 2015, and, under 35 U.S.C. § 119(e), claims priority to U.S. Provisional Patent Application Ser. No. 61/951,384 filed on Mar. 11, 2014.

STATEMENT REGARDING FEDERALLY SPONSORED RESEARCH OR DEVELOPMENT

This invention is not the subject of federally sponsored research or development.

RESERVATION OF COPYRIGHTS

Portions of the disclosure of this document contain material that is subject to copyright protection. The copyright owner has no objection to any reproduction of the document or disclosure as it appears in official records, but reserves all remaining rights under copyright.

BACKGROUND OF THE INVENTION

Automobile care, specifically respecting wheels and tires, can involve applying solutions ranging from neutral liquid water through corrosive atomized cleaners, polishes and preservatives. Particularly with the latter and oil-based products, unavoidable over spray and run off can discolor and degrade the work area, typically a garage or drive way. Cleaning the unsightly damage can be costly.

What is needed and not taught or suggested in the art is an apparatus for protecting a work area or surface that is easy to position about a wheel or tire and capture over-sprayed and runoff fluids employed in wheel care.

The invention provides improved elements and arrangements thereof, for the purposes described, which are inexpensive, dependable and effective in accomplishing intended purposes of the invention.

Other features and advantages of the invention will become apparent from the following description of the preferred embodiment, which refers to the accompanying drawings.

BRIEF DESCRIPTION OF THE DRAWING DRAWINGS

The invention is described in detail below with reference to the following figures, throughout which similar reference characters denote corresponding features consistently, wherein.

DETAILED DESCRIPTION OF THE PREFERRED EMBODIMENT

Figure 1:
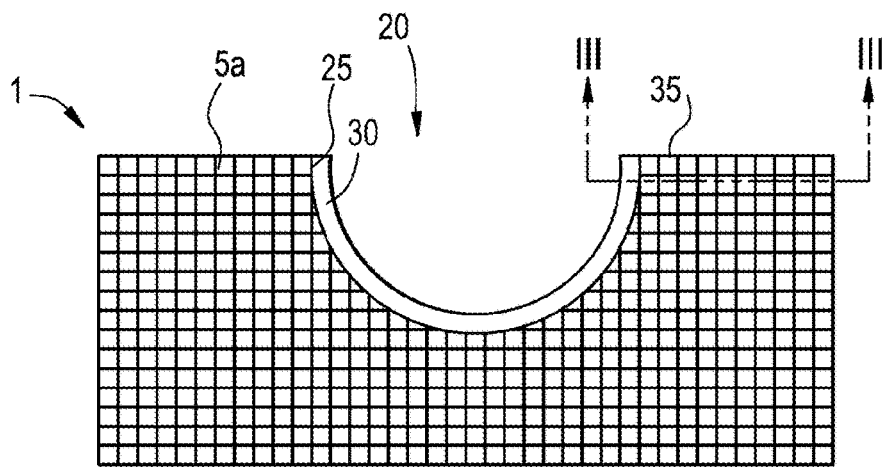
FIG. 1 is a plan view of an embodiment of an apparatus for protecting a surface configured according to principles of the invention.

This disclosure is not limited in application to the details of construction and the arrangement of components set forth or illustrated in the drawings herein. The disclosure is capable of other embodiments and of being practiced or of being carried out in various ways. Phraseology and terminology used herein is for description and should not be regarded as limiting. Uses of "including," "comprising" or "having" and variations thereof herein are meant to encompass the items listed thereafter and equivalents thereof as well as additional items. Unless limited otherwise, "connected," "coupled" and "mounted," and variations thereof herein are used broadly and encompass direct and indirect connections, couplings, and mountings. "Connected" and "coupled" and variations thereof are not restricted to physical or mechanical or electrical connections or couplings. Furthermore, and as described in subsequent paragraphs, the specific mechanical or electrical configurations described or illustrated are intended to exemplify embodiments of the disclosure. However, alternative mechanical or electrical configurations are possible, which are considered to be within the teachings of the disclosure. Furthermore, unless otherwise indicated, "or" is to be considered inclusive.

The invention is a mat that is easy to position about a tire and capture over-sprayed and runoff fluids employed in wheel care. Preferably, the mat is positioned proximate to a tire such that the mat entirely covers the immediate surface surrounding the footprint of the tire. Once positioned, the mat receives the over spray or run off fluids employed in caring for the wheel or tire.

Figure 3:
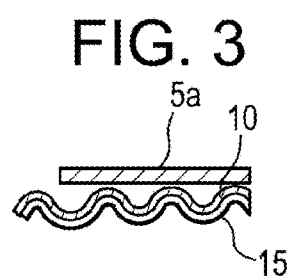
FIG. 3 is a cross-sectional detail view, drawn along line III-III in FIG. 1.

Referring to FIGS. 1 and 3, an embodiment of an apparatus 1 for protecting a surface configured according to principles of the invention includes a substrate 15 and a layer 5 disposed thereon. Substrate 15, preferably, is constructed of a corrugated material, such as cardboard. The corrugations are intended to receive and retain fluid caused by over-spraying or the runoff of solutions employed in maintaining wheels and tires. The corrugations also breakup large volumes of fluid received and prevent the fluid from sloshing about when the invention is removed following wheel maintenance. Other substrate configurations capable of providing these functions are contemplated.

In one embodiment, substrate 15 is constructed of materials that render substrate 15 substantially impervious to fluids, particularly oils or other fluids that could discolor or damage an underlying surface, such as concrete. The paper making arts are replete with many ingredients and techniques for obtaining imperviousness, such as introducing blocking waxes, such as naturally occurs in long-fiber, protein-based cellulose derived from cotton, agave and bast fibers, or absorbent resins or surfactants.

Another embodiment of the invention includes a coating, paint or other impervious layer 10 disposed on substrate 15. Impervious layer 10 cures as an independent layer. Alternatively, layer 10 adsorbs into substrate 15 and cures as a sub-layer within substrate 15 that is impervious as a recognizable sublayer or otherwise renders impervious substrate 15.

Figure 6:
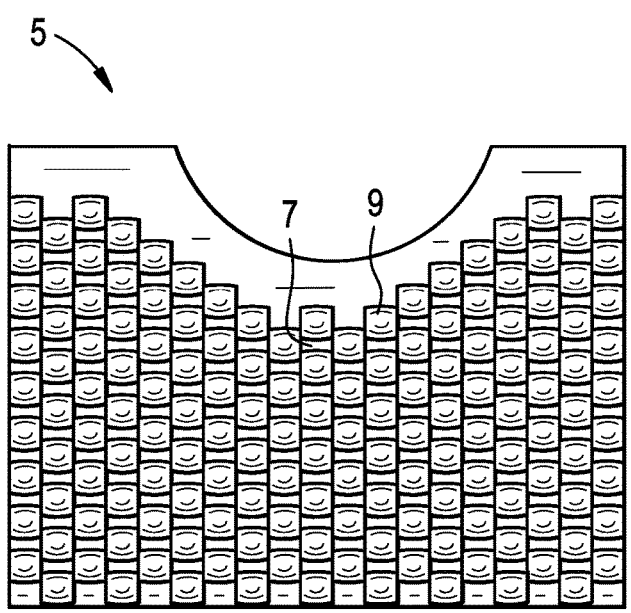
FIG. 6 is an image of an embodiment of FIG. 1 exhibiting a reduced size.

Referring also to FIGS. 3 and 6, layer 5, preferably, is constructed of a porous or perforated membrane, preferably constructed of rubber and/or soft, polyvinyl chloride (PVC). Layer 5 has Open Channels 7 and Closed Channels 9. Open Channels 7 readily permit fluid received on layer 5 to pass through to substrate 15. Closed Channels 9, preferably, absorb fluid received thereon.

Additionally, although the image of FIG. 6 is of a miniaturized embodiment of the invention, thus making the sizing of Open Channels 7 and Closed Channels 9 appear larger in the figure than in a properly-sized embodiment, Open Channels 7 and Closed Channels 9 are sized and configured to resist relatively large volumes of condensed fluid received on substrate 15 from flowing back out through layer 5. For example, as atomized cleaning fluid settles onto layer 5, condenses and then, if not absorbed by Closed Channels 9, flows through Open Channels 7 to substrate 15, condensed fluid accumulates on substrate 15. Once wheel care has been completed, the user would remove apparatus 1 from the work area. If apparatus 1 has received a great amount of fluid, the smallness of the openings of Open Channels 7 resist flow of large volumes of fluid that might be occasioned by a sudden dislocation of apparatus 1 that might produce sloshing of the retained fluid.

Open Channels 7 and Closed Channels 9 also are sized and configured to cooperate so as to retain excess fluid via capillary action. Capillary action or sometimes capillarity, capillary motion, or wicking, is the ability of a liquid to flow in narrow spaces without the assistance of, or even in opposition to, external forces like gravity. The invention harnesses this fluid phenomenon whereby, if a small amount of atomized fluid condenses on layer 5, the fluid may remain within open channel 7 on account of the inherent wicking capability of the fluid. As more fluid collects on layer 5, the weight of the fluid will draw the fluid through open channel 7 and onto substrate 15.

Preferably, impervious layer 10 is proximate to layer 5 so that fluid passing through layer 5 first encounters impervious layer 10. Uppermost positioning is preferred to prevent fluid adsorption into substrate 15 that, potentially being a corrosive cleaning solution, potentially could chemically degrade substrate 15. The fluid also could simply saturate substrate 15 and diminish its physical integrity like a waterlogged paper towel. Regardless of how the fluid could damage substrate 15, the result could manifest in the form of a rupture in substrate 15 that could allow the fluid to escape onto the surface that apparatus 1 is intended to protect from such fluids.

Figure 5:
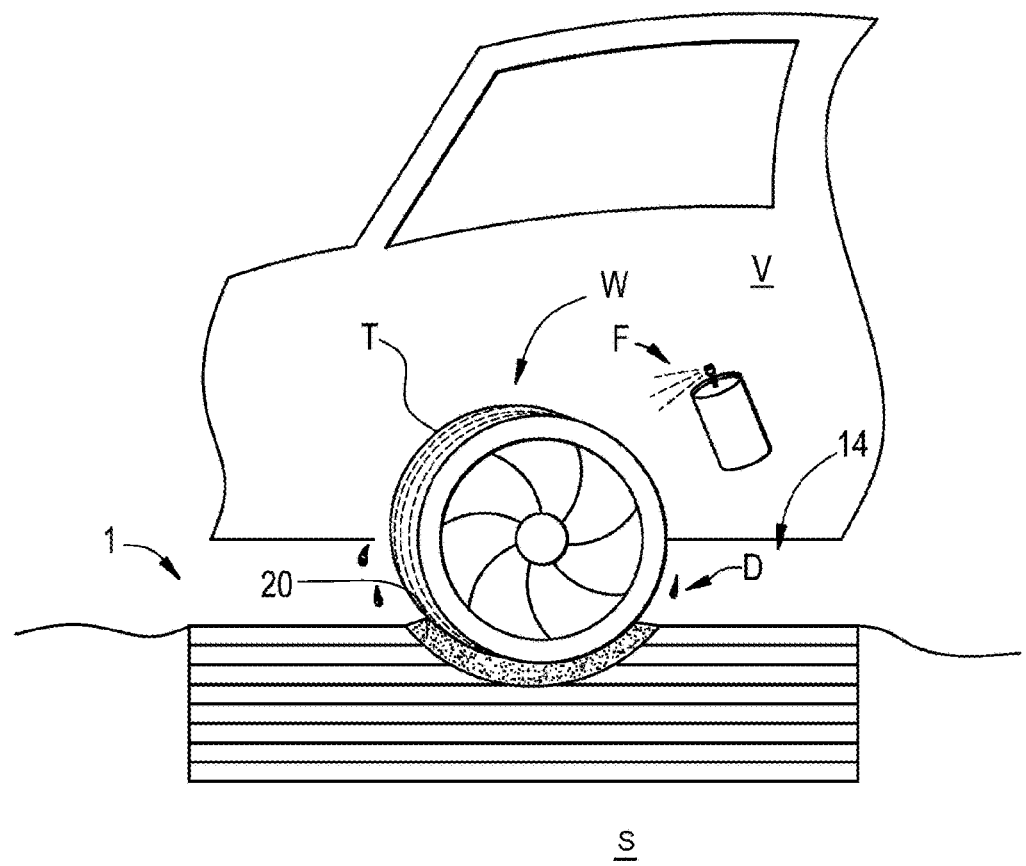
FIG. 5 is an environmental perspective view of the embodiment of FIG. 1 positioned relative to a wheel.

Substrate 15 has a leading edge 35 that has a recess 20. Preferably, recess 20 is configured to complement the footprint of a tire T mounted on a car (not shown) at rest on or in contact with the surface S of, e.g. a garage floor, as shown in FIG. 5. Apparatus 1 is not intended to be placed under Tire T, but be positioned as close to and minimize any gap with where Tire T makes contact with surface S so as to catch and prevent fluid from reaching surface S.

Because vehicles come in a variety of sizes and weights, apparatus 1 is constructed in different sizes to accommodated the smaller footprints of compact car tires through the larger footprints of sport utility vehicles and trucks. The configuration of recess 20 also may be coordinated or tuned according to the specifications of tires on the market. Recess 20 also may define a semicircle or U-shape.

Layer 5 covers nearly all, preferably 75%, of substrate 15. A spacing 30 is defined between an edge 25 of layer 5 and edge 35. Spacing 30 need not be uniform, but rather only configured to provide a thinness to facilitate positioning apparatus 1 as close to, if not wedged under tire T.

As may be understood from FIGS. 1 and 3, corrugations of substrate 15 in FIG. 1 are shown running from top to bottom relative to the page. Preferably, the corrugations run from side to side relative to the page. This orientation of the corrugations will promote retention of fluid collected therein from running out of the ends of corrugations, particularly as apparatus 1 is withdrawn from tire T. When apparatus is withdrawn from tire T, the inertia of the fluid received on substrate 15 may increase the tendency of the fluid to remain in place relative to the tire while apparatus 1 is pulled out from under it, like quickly withdrawing a table cloth and leaving the dishes on the table.

To avert leaving the fluid on the surface around a tire if the mat is withdrawn too quickly, one embodiment of the invention provides for obstructing the terminal ends of the corrugations by crimping or folding substrate 15 along its edges. Other embodiments provide for building up layer 10 or other means suited for accomplishing this purpose.

Figure 2:
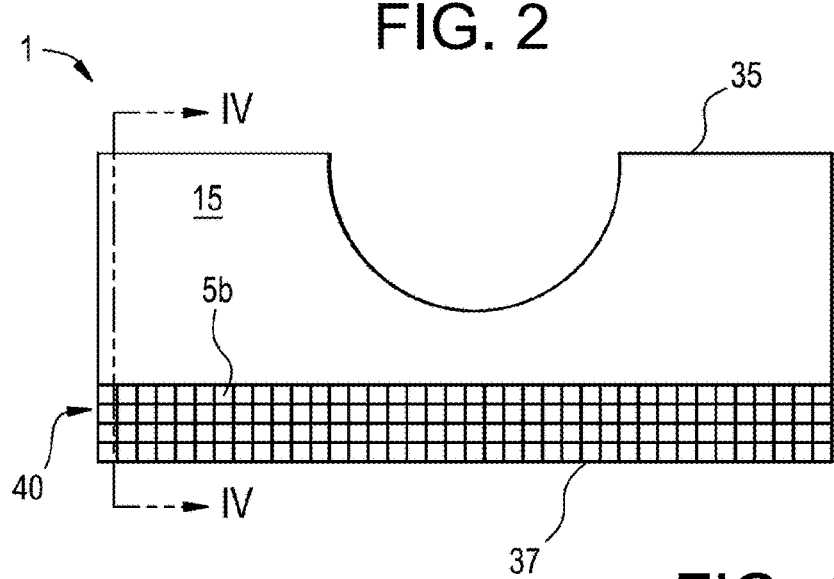
FIG. 2 is a bottom view of the embodiment of FIG. 1.
Figure 4:
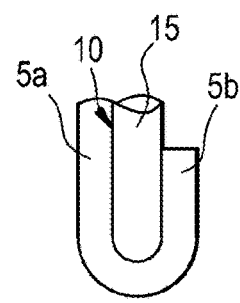
FIG. 4 is a cross-sectional detail view, drawn along line IV-IV in FIG. 2.

Referring to FIGS. 2 and 4, apparatus 1 includes an adherent portion 40 for increasing adherence of apparatus 1 to the surface intended to be protected. Preferably, adherent portion 40 covers about 10% of the bottom of substrate 15. Preferably, adherent portion 40 is achieved by folding a portion of layer 5 around a following edge 37 of substrate 15 so that, as shown in FIG. 4, portion 5a of layer 5 is on top of substrate 5 and portion 5b of layer 5 is on the bottom of substrate 15.

Referring to FIG. 5, in practice, apparatus 1 is positioned on the outside of a wheel W of a vehicle V, preferably such that recess 20 closely complements the footprint of the tire T. Vaporized fluid F, such as cleaning solution, is sprayed onto tire T or wheel W. Drips D of the fluid F from wheel W or tire T and/or condensed vaporized fluid F, rather than falling directly on a surface S on which tire T is at rest, falls onto apparatus 1. Drips D first contact layer 5. Fluid F passes through layer 5 and onto substrate 15. Preferably, being coated with impervious layer 10, substrate 15 retains rather than absorbs fluid F, which could thereafter stain surface S. When wheel/tire maintenance is completed, apparatus 1 is removed with the fluid retained therein.

The invention is not limited to the particular embodiment described and depicted herein, rather only to the following claims.

I claim:

1. Apparatus for protecting a surface on which a tire is at rest, the tire defining a footprint where the tire is in contact with the surface, comprising:
    a substrate configured to receive fluid; and
    a layer disposed on and having opened and closed channels sized and configured to pass fluid to said substrate;
    wherein:
        said opened and closed channels are sized and configured to retain fluid due to capillary action; and
        said substrate has a leading edge with a recess having a configuration that concavely corresponds to the footprint.

2. Apparatus of claim 1, wherein said substrate is fluid impermeable.

3. Apparatus of claim 1, further comprising an impermeable coating or layer interposed between said substrate and said layer.

4. Apparatus of claim 1, wherein said substrate has corrugations.

5. Apparatus of claim 1, wherein said layer is constructed of perforated rubber.

6. Apparatus of claim 1, wherein said layer and said substrate define a spacing adjacent to said recess where said layer is not disposed on said substrate.

7. Apparatus of claim 1, wherein said substrate has corrugations that are aligned with said leading edge.

8. Apparatus of claim 1, wherein said substrate has a bottom side that is adapted to adhere to the surface.

9. Apparatus of claim 1, wherein said substrate has a top side and a bottom side, said layer being disposed on said top side, wrapping around a following edge of said substrate and extending along said bottom side toward said leading edge.

10. Apparatus of claim 9, wherein at least the portion of said layer on said bottom side is configured to adhere to the surface.

\* \* \* \* \*